United States Patent
Schulze (10) Patent No.: US 9,562,617 B2
(45) Date of Patent: Feb. 7, 2017

(54) GAS FLOW MONITOR (75) Inventor: Klaus Schulze, Gernrode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 1004 days.

(21) Appl. No.: 13/388,196

(22) PCT Filed: Jul. 26, 2010

(86) PCT No.: PCT/EP2010/004562
§ 371 (c)(1),
(2), (4) Date: Jan. 31, 2012

(87) PCT Pub. No.: WO2011/012277
PCT Pub. Date: Feb. 3, 2011

(65) Prior Publication Data
US 2012/0125455 A1 May 24, 2012

(30) Foreign Application Priority Data

Jul. 31, 2009 (DE) .................. 10 2009 036 201

(51) Int. Cl.
*F16K 17/30* (2006.01)
(52) U.S. Cl.
CPC .......... *F16K 17/30* (2013.01); *Y10T 137/7922* (2015.04)
(58) Field of Classification Search
CPC ...................................... F16K 17/30
USPC ....................... 137/460, 517, 542
See application file for complete search history.

(56) References Cited

U.S. PATENT DOCUMENTS

| 755,996 | A | | 3/1904 | Brune |
| 2,357,321 | A | * | 9/1944 | Fuller ........................ 137/460 |
| 2,526,346 | A | | 10/1950 | Goldinger |
| 2,647,533 | A | | 8/1953 | Beymer |
| 2,655,934 | A | | 10/1953 | Clair |
| 2,873,760 | A | | 2/1959 | Safford |

(Continued)

FOREIGN PATENT DOCUMENTS

| DE | 2924533 A1 | 1/1981 |
| DE | 4300432 A1 | 7/1994 |

(Continued)

OTHER PUBLICATIONS

Machine assisted English translation for DE 2924533 extracted from the espacenet.com database on Aug. 10, 2012, 12 pages.

(Continued)

*Primary Examiner* — Kevin Lee
*Assistant Examiner* — P. Macade Nichols
(74) *Attorney, Agent, or Firm* — Howard & Howard Attorneys PLLC (57) ABSTRACT

The invention relates to a gas flow monitor wherein the closing flow has the same value in a plurality of installation positions. According to the invention, the gas flow monitor is further intended to be suitable for small pressure loss values. Design and production are intended to be as simple as possible.

The gas flow monitor according to the invention, comprising a gas-tight housing (1) that has a valve seat (4) for an axially movable closing body (10) in the interior that to is held against the direction of flow in the opening position by spring force, is characterized in that the play of said mounting is greater in the open position and continuously narrows upon beginning the closing movement.

20 Claims, 7 Drawing Sheets

(56) References Cited

U.S. PATENT DOCUMENTS

| | | | |
|---|---|---|---|
| 3,918,481 | A | 11/1975 | Doe et al. |
| 4,075,294 | A * | 2/1978 | Saito ................ F02M 7/093 |
| | | | 137/504 |
| 4,609,014 | A | 9/1986 | Jurjevic et al. |
| 5,105,850 | A | 4/1992 | Harris |
| 5,755,259 | A | 5/1998 | Schulze et al. |
| 6,279,175 | B1 | 8/2001 | Blaney |
| 6,308,730 | B1 | 10/2001 | Schulze |
| 6,892,756 | B2 | 5/2005 | Schulze |
| 2002/0130291 | A1 | 9/2002 | Geib et al. |
| 2004/0031524 | A1 | 2/2004 | Schulze |
| 2010/0012202 | A1 | 1/2010 | Norbert et al. |
| 2012/0125455 | A1 | 5/2012 | Schulze |

FOREIGN PATENT DOCUMENTS

| | | |
|---|---|---|
| DE | 20116899 U1 | 12/2001 |
| DE | 10043811 A1 | 4/2002 |
| DE | 10202067 A1 | 7/2003 |
| DE | 20317261 U1 | 1/2004 |
| DE | 10340679 A1 | 3/2005 |
| DE | 202005001685 U1 | 5/2005 |
| DE | 10352372 A1 | 6/2005 |
| DE | 102004006664 A1 | 9/2005 |
| DE | 102005009438 A1 | 9/2006 |
| DE | 102006028466 A1 | 12/2007 |
| DE | 102007008285 A1 | 8/2008 |
| DE | 102007010227 A1 | 9/2008 |
| EP | 1605193 A1 | 12/2005 |
| JP | 03-033572 | 2/1991 |
| WO | WO 9963254 A1 | 12/1999 |

OTHER PUBLICATIONS

English language abstract for DE 4300432 extracted from the espacenet.com database on Aug. 10, 2012, 7 pages.

Machine assisted English translation for DE 20116899 extracted from the espacenet.com database on Aug. 17, 2012, 22 pages.

English language abstract not available for DE 10043811; however, see English language equivalent U.S. Pat. No. 6,892,756. Original document extracted from the espacenet.com database on Aug. 17, 2012, 9 pages.

English language abstract and machine-assisted translation for DE 10202067 extracted from the espacenet.com database on Aug. 17, 2012, 23 pages.

English language abstract and machine-assisted translation for DE 20317261 extracted from the espacenet.com database on Aug. 17, 2012, 26 pages.

English language abstract and machine-assisted translation for DE 10340679 extracted from the espacenet.com database on Aug. 17, 2012, 10 pages.

English language abstract and machine-assisted translation for DE 202005001685 extracted from the espacenet.com database on Aug. 17, 2012, 12 pages.

English language abstract and machine-assisted translation for DE 1035372 extracted from the espacenet.com database on Aug. 17, 2012, 25 pages.

English language abstract and machine-assisted translation for DE 102004006664 extracted from the espacenet.com database on Aug. 17, 2012, 15 pages.

English language abstract and machine assisted translation for DE 102005009438 extracted from the espacenet.com database on Aug. 10, 2012, 20 pages.

English language abstract and machine assisted translation for DE 102006028466 extracted from the espacenet.com database on Aug. 10, 2012, 9 pages.

English language abstract and machine assisted translation for DE 102007008285 extracted from the espacenet.com database on Aug. 10, 2012, 10 pages.

English language abstract for DE 102007010227 extracted from the espacenet.com database on Aug. 10, 2012, 9 pages.

English language abstract and machine-assisted translation for EP 1605193 extracted from the espacenet.com database on Aug. 17, 2012, 31 pages.

English language abstract for JP 03-033572 extracted from the espacenet.com database on Aug. 17, 2012, 13 pages.

English language abstract for WO 9963254 extracted from the espacenet.com database on Aug. 17, 2012, 22 pages.

International Search Report for Application No. PCT/EP2010/004562 dated Jan. 25, 2011, 2 pages.

* cited by examiner

Einzelheit A

GAS FLOW MONITOR

CROSS-REFERENCE TO RELATED APPLICATIONS

The subject patent application claims priority to and all the benefits of International Application No. PCT/EP2010/004562 filed on Jul. 26, 2010 with the World Intellectual Property Organization, which claims priority to German Patent Application No. 10 2009 036 201.0 filed on Jul. 31, 2009, the specifications and drawings of which are expressly incorporated herein by reference.

TECHNICAL FIELD OF THE INVENTION

The invention relates to a gas flow monitor in accordance with the preamble to the first claim for automatically shutting off downstream gas conduits when a defined maximum flow is exceeded.

PRIOR ART

Gas flow monitors serve to shut off the gas supply to the downstream gas conduit if gas consumption exceeds a preset value, a situation that occurs for example in the case of fractured pipes or inadmissibly high rates of leaks. These devices exist in a multitude of embodiments. They are used in pipes, for example upstream of gas valves and fittings, gas appliances etc. In order to set the required closing or nominal flow rate, a spring is biased by adjustable stops in such a manner that the force resulting from the biasing of the spring and the flow force of the gas flow cause the gas flow monitor to assume its closed or open position.

Common to all these embodiments is the fact that they are adjusted to a defined closing flow, i.e. the gas flow rate at which the gas flow monitor closes. Strict limits have been set for the deviations resulting from manufacturing tolerances because of safety requirements.

These embodiments therefore have the fundamental disadvantage that the value of the closing flow applies only to the installation position of the gas flow monitor when the adjustment was carried out. This is because the dead weight of the valve disc and any additional components combined with it also has an effect apart from the spring. Gas flow monitors therefore have a higher closing flow in the vertical installation position with upward flow direction than in the horizontal installation position. This means that different variants must be available for the different installation positions which leads in turn to increased production and storage costs.

A gas flow monitor which can be used with a standard adjustment for different installation positions is known for example from DE 10 2005 009 438 A1. This gas flow monitor is constructed in such a manner that the valve axis formed from a valve seat, a closing body assigned to the valve seat and a guide for the closing body is inclined towards the housing axis. The inclined arrangement of the axis of the valve comprising valve seat, guide and closing body to the axis of the housing in which the valve is located results in a plurality of installation positions in which the effect of the dead weight of the moving parts on the spring force is identical so that the same closing flow arises in all these installation positions.

This solution is disadvantageous because, apart from the gas inlet and gas outlet, the housing has an additional opening that must be sealed gastight and, most importantly, must be as tamper-proof as far as possible. Its structure per se also entails a complex manufacturing process. In addition, when installing the device in a horizontal position it must be ensured that the inclined valve axis assumes a prescribed position so that the adjusted closing flow is maintained. This frequently presents difficulties especially if the housing has to be screwed into a pipeline.

A further gas flow monitor that can be used with a standard adjustment in different installation positions is described in DE 10 2006 028 466 A1. The valve seat of the valve body is formed here by an elastic sealing element on which the shut-off body bears in the closed position. This arrangement makes the shut-off body lighter thereby minimising the weight-related effects resulting from the installation position.

Although the weight is minimised, the differently acting dead weights of the parts moving during the closing operation and the different friction ratios cause a fluctuation in the value of the closing flow in the different installation positions which is included in the permitted deviations of the manufacturing tolerances and is thus no longer available for the closing flow, thereby entailing increased production costs in order to remain within the maximum permissible deviations.

It has proved particularly difficult to maintain the permissible deviations of the dosing value with gas flow monitors with a very small pressure differential, as are required especially for domestic installations, because the spring force in these cases must be extremely low and the dead weight of the valve disc consequently plays a greater role.

Nor is this solution suitable for gas flow monitors which have an attenuation function to prevent the pipework downstream of the gas flow monitor being shut off during short-term peak flows. Creating an attenuation function requires additional structural work which also results in increased weight.

In addition, the position of the elastic sealing element as a valve seat is a disadvantage in creating a design with optimum flow characteristics as it can lead to an increase in pressure loss.

A flow monitor that can be installed in any installation position and a suitable connection device are described in DE 10 2007 008 285 A1. This solution provides a means of increasing the flow rate of the medium flowing in the flow channel. The increased flow rate increases the force acting on the shut-off body to such an extent that the weight of the shut-off body is small in comparison with that force.

The weight is also minimised here even if only to a relative degree. In addition, the additional constriction gives rise to flow-related problems, especially an increased pressure loss, which leads to the disadvantages already described above.

DESCRIPTION OF THE INVENTION

The present invention addresses the problem of developing a gas flow monitor of the named type in which the closing flow has the same value in a plurality of installation positions. The gas flow monitor is also to be suitable for low pressure loss values. Design and production are to be as simple as possible.

This problem is solved according to the invention in that with a gas flow monitor with a gas-tight housing which has in its interior a valve seat for an axially movable closing body which is held against the direction of flow in the open position by spring force, the play of this mounting is greater in the open position and continuously narrows at the start of the closing movement.

This provides a solution which eliminates the disadvantages of the state of the art referred to above. This solution makes it possible to install the housing of the gas flow monitor in the horizontal position and in the vertical position with an upward flow direction. These two installation positions may be regarded as the most widely used types of installation positions.

Further advantageous embodiments of the invention are set out in the other claims.

For example, to simplify manufacture it has proved advantageous with a gas flow monitor of the named type to create the constriction of the play of the mounting at the start of the closing movement by a bevel that has been determined in such a manner that approximately the same force acting against the closing movement is required to lift the closing body when the gas flow monitor is installed in a horizontal position as is required when the gas flow monitor is installed in a vertical position with an upward flow direction.

A further preferred embodiment of the invention can be created if the closing body is permanently connected to a pin mounted in the housing.

This embodiment in particular according to the invention is also suitable for gas flow monitors with an attenuation function. This attenuation function is always desirable in situations where short-term peak flows may occur in the pipework downstream of the gas flow monitor that exceed normal consumption to such an extent that the closing flow rate set is exceeded. Examples of these include gas appliances that are switched by an abruptly opening solenoid-operated valve. This attenuation function prevents an undesired closing of the gas flow monitor even at a closing flow rate set close to normal consumption, a setting which is advisable for safety reasons.

To that end the guide has a cylindrical extension which is sealed on its front side by a cap. The pin projects into this space formed by the extension and the cap, with the pin connected to a damping piston by a pivotable connection which is to guided in a longitudinally movable manner on the inner wall. This creates a partition of this space, and the volume compensation, which is required during a movement of the closing body and which is provided by the restriction formed by the damping piston and inner wall, does not lead to the gas flow monitor closing abruptly during a peak flow. After the peak flow has abated, the closing body is returned to its open position by a spring.

A further preferred embodiment of the invention can be created if the closing body is mounted on a pin permanently connected to the housing.

This embodiment proves to be particularly advantageous with gas flow monitors which are fitted with a so-called overflow opening and which make possible an automatic reopening after the cause of the closing has been rectified. The annular space between the pin and closing body can be determined here in such a manner that it forms the required overflow opening, at least for the closed position.

In another possible embodiment the housing has guide ribs for an axially displaceable mounting of the closing body. This embodiment is characterised by the fact that the closing body is extremely light. In addition, the housing and closing body are highly suitable for manufacturing from plastic. An overflow opening, if required, can also be inserted very easily and with great accuracy into the closing body.

EXECUTION EXAMPLE

Examples of embodiments of a gas flow monitor according to the invention are explained below in more detail by means of execution examples. The diagrams show the following details.

Figure 1:
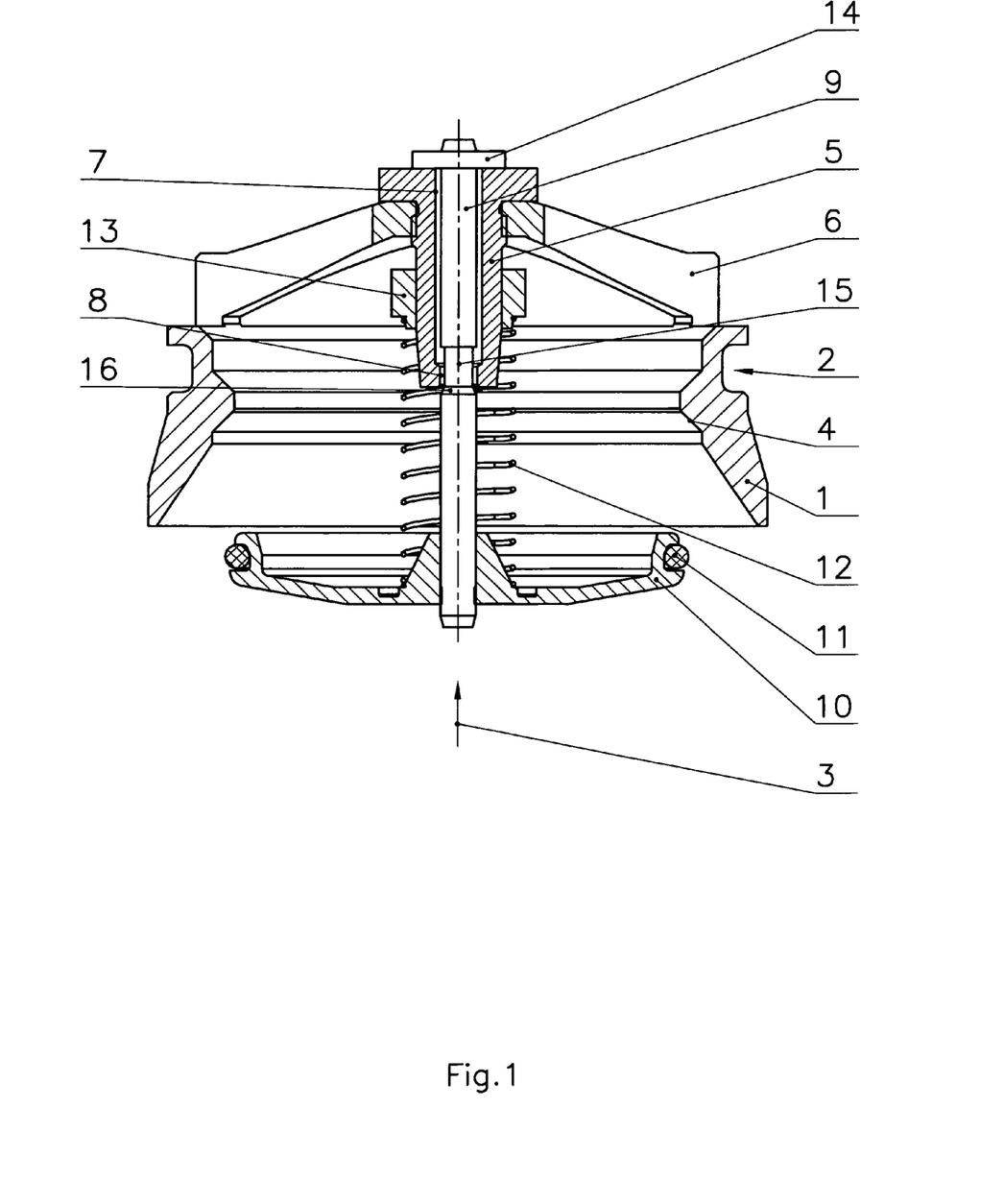
FIG. 1 a gas flow monitor according to the invention in the open position in a vertical installation position, FIG. 2 a gas flow monitor according to the invention with attenuation function in the open position in a horizontal installation position FIG. 3 a detailed view from FIG. 2, FIG. 4 a gas flow monitor according to the invention with attenuation function in the closed position in a horizontal installation position, FIG. 5 another embodiment of a gas flow monitor according to the invention with attenuation function in the open position in a horizontal installation position, FIG. 6 a further embodiment of a gas flow monitor according to the invention in the open position in a horizontal installation position, FIG. 7 a schematic diagram of an embodiment of a gas flow monitor according to the invention in the open position in a horizontal installation position.

FIG. 1 shows an initial execution example of a gas flow monitor according to the invention in the open position. The gas flow monitor is depicted in a vertical installation position. It comprises a tubular housing 1 that can be pushed into a gas conduit (not illustrated). The housing 1 has a circumferential groove 2 for an O-ring (again not illustrated) in order to guarantee the required tightness between the gas conduit and housing 1. Another connection is of course also possible.

Gas can flow through the housing 1 in the direction shown by a directional arrow 3. The housing 1 has a constriction positioned approximately centrally which is formed as a valve seat 4 on its side facing the gas inlet. On the outlet side of the housing 1 a guide 5 is located which has through flow openings for the gas flow formed by a plurality of radial webs 6. In this execution example the guide 5 is connected to the housing 1 by the webs 6.

The guide 5 has a throughbore 7 in the axial direction positioned centrally which is formed at least partly as a guide bore 8 for a longitudinally movable pin 9 which has a stop 14 at its outlet end. A plate-shaped closing body 10 is attached on the inlet side of the pin 9 by means of press fit for example. The closing body 10 has an annular groove for an O-ring 11 serving as an elastic sealing element in order to achieve the required tightness in the closed position of the gas flow monitor. A spring 12 bears on the side of the closing body 10 facing the housing 1, with its other end supported on an adjusting element 13 which is arranged on the guide 5 so as to be adjustable in position, in this example by means of a screwed connection. The stop 14 bears on the guide 5 under the force of the spring 12, thereby restricting the maximum opening lift of the closing body 10.

As can be seen from FIG. 1, the pin 9 has a constriction 15 which covers the area of the guide bore 8 in the open position of the gas flow monitor. The transition area which is located outside the guide bore 8 and which enters said guide bore at the start of the closing movement of the closing body 10, is formed as a bevel 16 which ensures a continuous transition.

Figure 2:
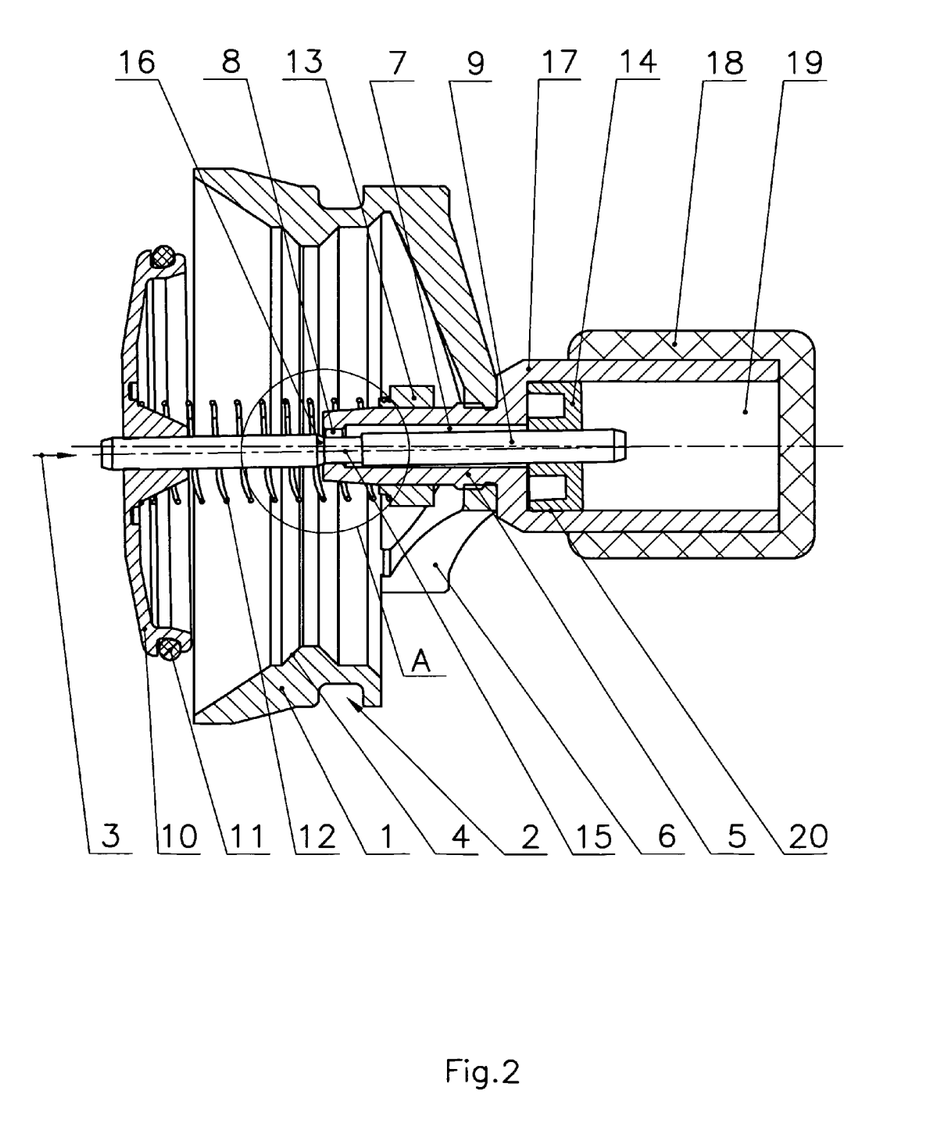

A modified embodiment of the gas flow monitor according to the invention is shown in FIG. 2 also in the open position as a further execution example, this time however in the horizontal installation position. The gas flow monitor is fitted with an attenuation device which makes it less insensitive to fluctuations. The necessity for this arrangement has already been acknowledged above.

As can be seen, there is no correspondence between the longitudinal axis of the valve seat 4 and the longitudinal axis of the closing body 10, which is identical to the longitudinal axis of the pin 9 in the permanent connection between pin 9 and closing body 10 shown in this execution example. As can be seen from the detail A in FIG. 2 shown in enlarged form in FIG. 3 the constriction 15 in the guide bore 8 already described above bears unilaterally on a support point 21, thereby causing the change in position of the closing body 10.

Figure 3:
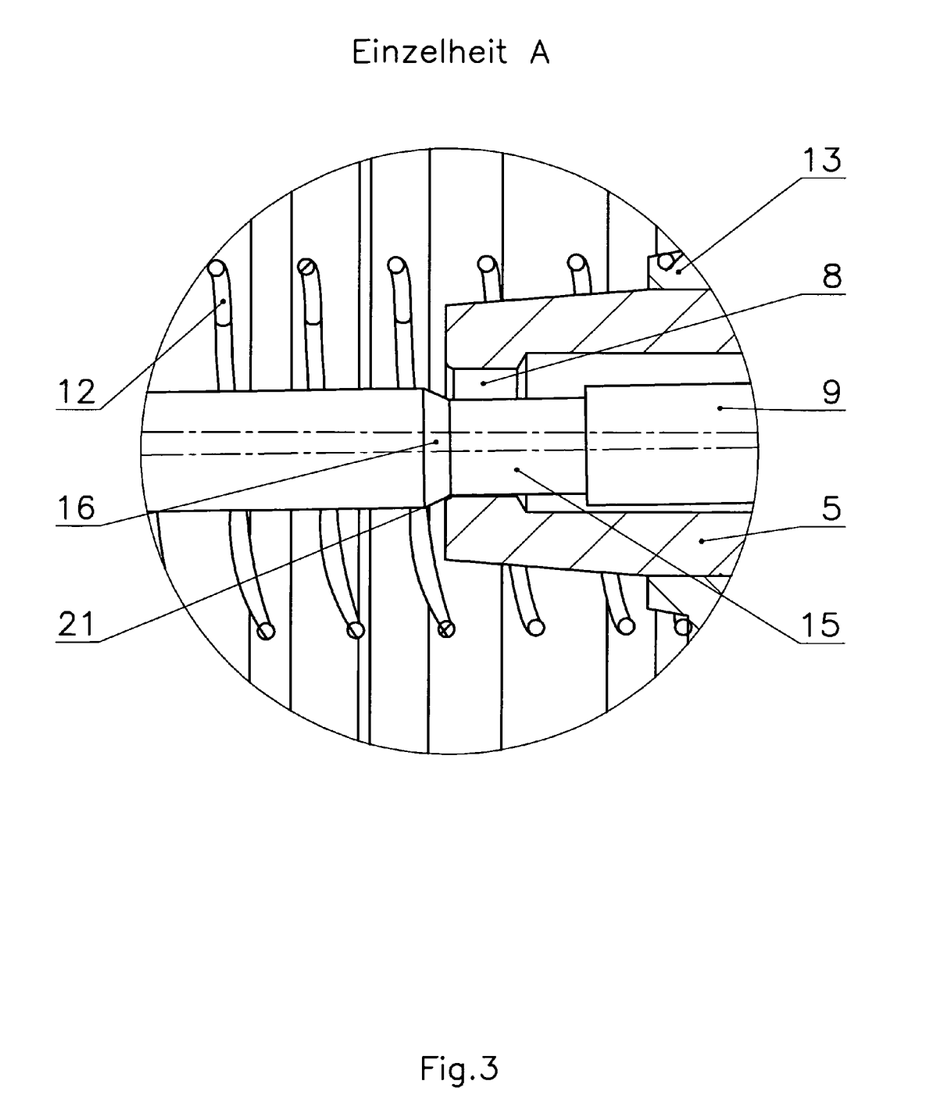

At the start of the closing movement the bevel 16 slides into the guide bore 8 and lifts the closing body 10 until the longitudinal axes of valve seat 4 and closing body 10 are approximately identical.

The bevel 16 is determined here in such a manner that the force required to overcome it corresponds approximately to the force exerted by the weight of the moving components, in this case closing body 10 and pin 9, with the gas flow monitor installed in a vertical installation position and a gas flow directed upwards.

This provides the required solution namely that the closing flow of a gas flow monitor has almost the same value in both installation positions shown.

Figure 4:
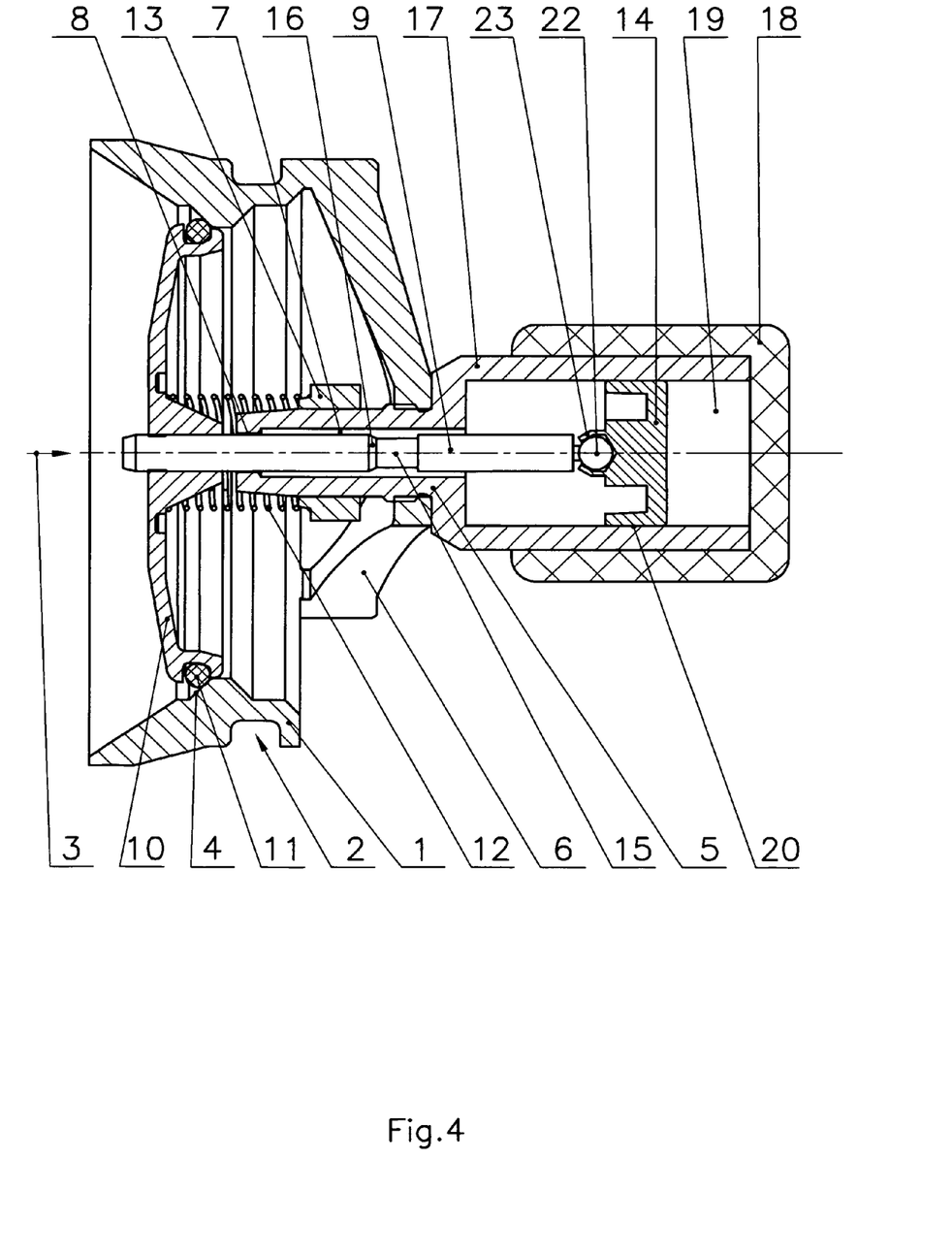
Figure 5:
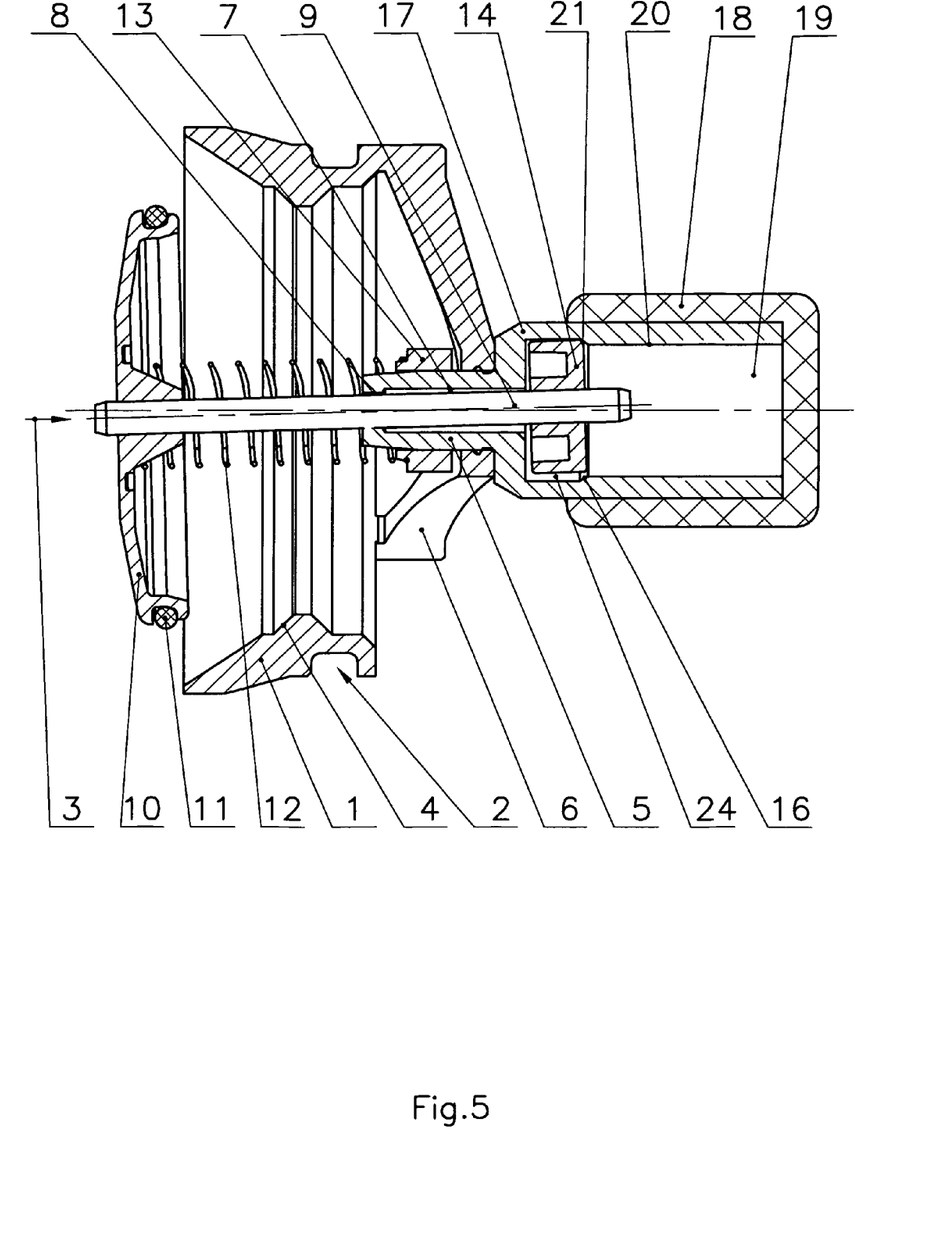

Apart from the structure, which in other respects is basically the same as the gas flow monitor shown in FIG. 5, the guide 5 has on its side facing away from the housing 1 a cylindrical extension 17 sealed on its front side by a cap 18. The pin 9 extending into the space 19 formed by extension 17 and cap 18 is guided in a longitudinally movable manner on the inner wall via the stop 14 of the pin 9, with stop 14 and inner wall forming an annular space 20 which forms a restriction to provide the required volume compensation during a movement of the closing body 10. As a result the occurrence of a short term peak flow whose value exceeds the closing flow rate does not lead to the gas flow monitor closing abruptly, but merely initiates a delayed closing movement. After the peak flow has abated, the closing body 10 is returned to its open position by the spring 12. If, however, the closing flow rate is exceeded over an extended period of time, as occurs in the case of a leak, the gas flow monitor assumes the closed position, as shown in FIG. 4.

In order to avoid possible problems in ensuring the sealing function because of the skewed position of the pin 9, the stop 14 is pivotably attached on the pin 9 in FIG. 4 in a modification of the position shown in FIG. 3. As shown, this can be achieved, by constructing the pin 9 at its end extending into the space 19 as a ball 22 which is partly surrounded by tongue elements 23.

A further modified execution example is depicted in FIG. 5. Like the example shown in FIG. 3, this also depicts a gas flow monitor fitted with an attenuation function. In this case the position of closing body 10 can be changed not by a constriction 15 on the pin 9 but by using the attenuation element.

To that end the cylindrical extension 17 has a circumferential recess 24 in the area where the stop 14 is located in the open position of the gas flow monitor, with said recess narrowing again to the original dimensions via the bevel 16.

Because of the greater amount of play the closing body 10, which is permanently connected to the pin 9, also changes position here in the horizontal installation position until the stop 14 bears on the support point 21. At the start of the closing movement the stop 14 slides over the bevel 16 into the space 19 and causes the closing body 10 to lift.

Figure 6:
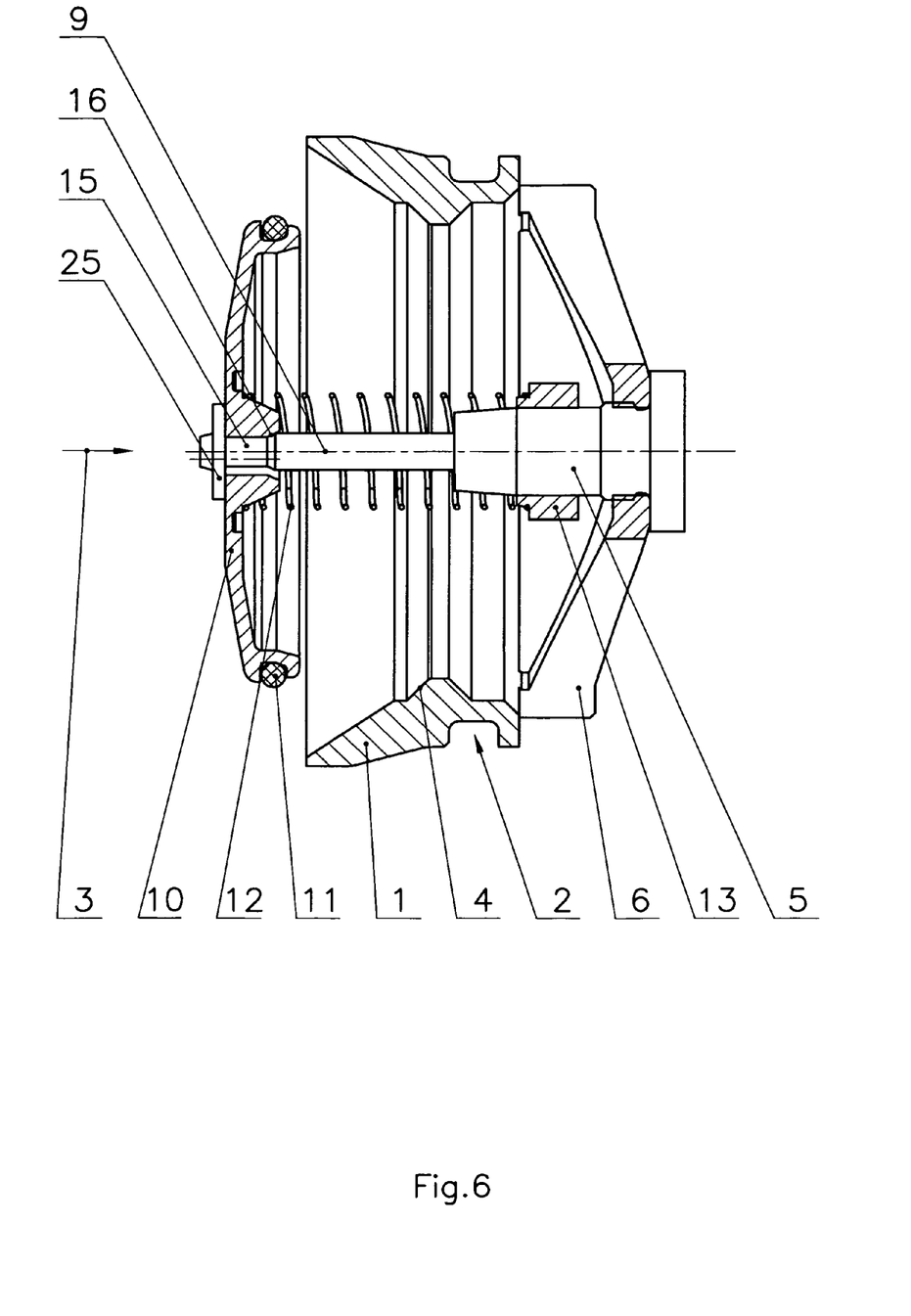

FIG. 6 shows an embodiment of a gas flow monitor—again in a horizontal installation position—in which the pin 9 is permanently connected to the housing 1. The closing body 10 is mounted on the pin 9 so as to be axially displaceable and under the acting force of the spring 12 bears on a washer 25 permanently arranged on the pin 9 whereby the open position is defined.

In the area where the closing body 10 in the open position rests on the pin 9, said pin has a constriction 15 which is terminated in an adjoining bevel 16 outside the bearing position of the closing body 10. The closing body 10 is supported unilaterally in the constriction 15 because of the horizontal installation position. At the start of the closing movement the closing body 10 slides over the bevel 16 and is lifted in the process into its closed position.

In this arrangement the bevel 16 is determined in such a manner that the force required to overcome it corresponds approximately to the force exerted by the weight of the single (in this case) moving component, the closing body 10, with the gas flow monitor installed in a vertical installation position and a gas flow directed upwards.

It is advantageous if the annular space between pin 9 and closing body 10 required in this embodiment is determined in such a manner at least in this position that it forms a required overflow opening for an automatic reopening after the cause of the closing has been rectified.

Figure 7:
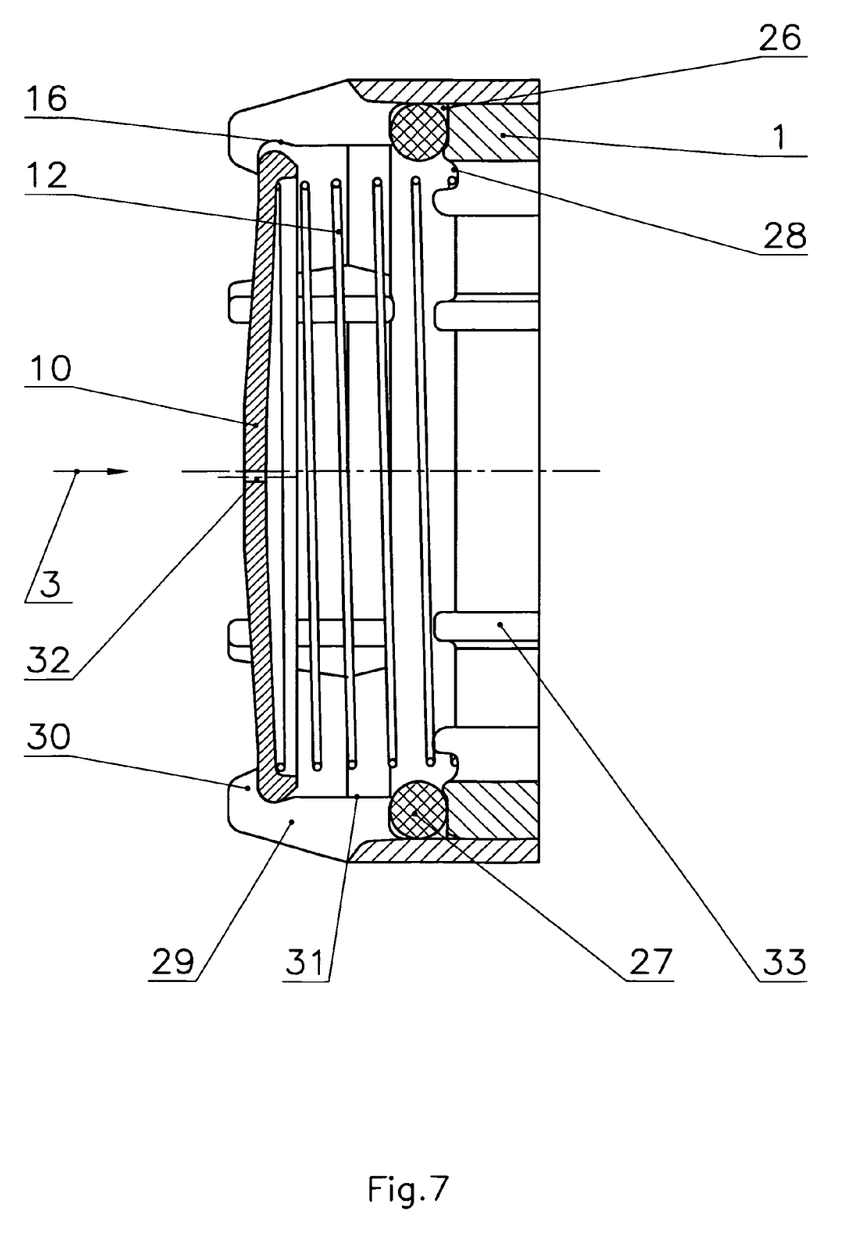

FIG. 7 shows a schematic diagram of a further embodiment of a gas flow monitor according to the invention in the open position in the horizontal installation position. The housing 1 has in its interior a circumferential groove 26 in which an O-ring 27 serving as a valve seat is axially mounted. In addition, in the interior of the housing 1 in the direction of flow downstream of the O-ring 27, ribs 33 (six ribs in this execution example) are arranged on whose front sides turned towards the O-ring a support 28 is formed for supporting the spring 12. The other side of the spring 12 acts in the opening direction on the closing body 10 which is mounted so as to be axially displaceable on a guide contour 31 in guide ribs 29 (of which there are also six) formed on the housing 1, with said closing body supported at the end on hooks 30 bent inwards.

In the area where the closing body 10 is in the open position the guide contour 31 formed by the guide ribs 29 has the recess 24 which leads via the bevel 16 to the guide contour 31.

The closing body 10 in the open position is also mounted here unilaterally in the recess 24 because of the horizontal installation position and is lifted at the start of the closing movement in order to then assume, guided by the guide contour 31, the closed position which is not shown.

This embodiment is particularly suitable for manufacturing from plastic components and is characterised by the simplicity of its design. The closing body 10 in particular is very light. In addition, an overflow opening 32 if required can be made very easily and with great accuracy in the closing body 10 in this embodiment.

| List of reference numerals | |
|---|---|
| 1 | Housing |
| 2 | Groove |
| 3 | Directional arrow |
| 4 | Valve seat |
| 5 | Guide |
| 6 | Web |
| 7 | Throughbore |
| 8 | Guide bore |
| 9 | Pin |
| 10 | Closing body |
| 11 | O-ring |
| 12 | Spring |
| 13 | Adjusting element |
| 14 | Stop |

-continued

| List of reference numerals | |
|---|---|
| 15 | Constriction |
| 16 | Bevel |
| 17 | Extension |
| 18 | Cap |
| 19 | Space |
| 20 | Annular space |
| 21 | Support point |
| 22 | Ball |
| 23 | Tongue element |
| 24 | Recess |
| 25 | Washer |
| 26 | Groove |
| 27 | O-ring |
| 28 | Support |
| 29 | Guide rib |
| 30 | Hook |
| 31 | Guide contour |
| 32 | Overflow opening |
| 33 | Rib |

The invention claimed is:

1. A gas flow monitor for automatically shutting off downstream gas conduits when a defined maximum flow is exceeded, with a gas-tight housing that has in a housing interior a valve seat for an axially movable closing body that is held against a direction of flow in an open position by spring force, wherein play of the closing body relative to the housing (1) is greater in the open position and continuously narrows at a start of a closing movement so as in a horizontal installation position, to lift the closing body in aligning a longitudinal axis of the closing body with a longitudinal axis of the housing; wherein the spring force restores the closing body (12) to the open position when the defined maximum is not exceeded.

2. The gas flow monitor according to claim 1, wherein the closing body (10) is permanently connected to a pin (9) mounted in the housing (1).

3. The gas flow monitor according to claim 1, wherein the closing body (10) is mounted so as to be axially displaceable in guide ribs (29) which are permanently connected to the housing (1).

4. A gas flow monitor for automatically shutting off downstream gas conduits when a defined maximum flow is exceeded, the gas flow monitor comprising:
a housing (1);
a closing body (10) coupled to the housing (1) and moveable relative to the housing (1) between an open position and a closed position;
a spring (12) disposed between the housing (1) and the closing body (10) for urging the closing body (10) toward the open position; and
a constriction (15) disposed between the housing (1) and the closing body (10), increasing a force required to move the closing body (10) to the closed position when the gas flow monitor is installed in a horizontal position in aligning a longitudinal axis of the closing body with a longitudinal axis of the housing, such that the force required to move the closing body (10) to the closed position when the gas flow monitor is installed in the horizontal position is approximately the same as the force required to move the closing body (10) to the closed position when the gas flow monitor is installed in a vertical position;
wherein the spring (12) urges the closing body (10) to the open position when the defined maximum is not exceeded.

5. The gas flow monitor according to claim 4, further comprising a pin (9) disposed between the closing body (10) and the housing (1) and being moveable relative to the housing (1).

6. The gas flow monitor according to claim 5, wherein the constriction (15) is disposed between the pin (9) and the housing (1).

7. The gas flow monitor according to claim 6, wherein the constriction (15) includes a bevel (6) defined on the pin (9) configured to contact the housing (1) as the closing body (10) moves from the open position to the closed position.

8. The gas flow monitor according to claim 7, wherein the housing (1) defines a guide bore (8) that receives the pin (9) and contacts the bevel (6) as the closing body (10) moves from the open position to the closed position.

9. The gas flow monitor according to claim 5, further comprising a stop (14) fixed to the pin (9), the constriction (15) being disposed in association with the stop (14).

10. The gas flow monitor according to claim 9, wherein the constriction (15) includes a bevel (16) configured to contact the stop (14) as the closing body (10) moves from the open position to the closed position.

11. The gas flow monitor according to claim 4, further comprising a pin (9) disposed between the closing body (10) and the housing (1) with the closing body (10) being moveable relative to the pin (9).

12. The gas flow monitor according to claim 11, wherein the constriction (15) is disposed between the closing body (10) and the pin (9).

13. The gas flow monitor according to claim 12, wherein the closing body (10) defines a bore receiving the pin (9), the constriction (15) including a bevel (16) defined on the pin (9) and configured to contact the closing body (10) as the closing body (10) moves from the open position to the closed position.

14. The gas flow monitor according to claim 4, wherein the housing (1) includes a valve seat (4) that contacts the closing body (10) when the closing body (10) is in the closed position, the housing (1) including hooks (30) that retain the closing body (10) and allow flow through the housing (1) when the closing body (10) is in the open position.

15. The gas flow monitor according to claim 14, wherein the constriction (15) is disposed between the hooks (30) and the closing body (10).

16. The gas flow monitor according to claim 15, wherein the constriction (15) includes a bevel (16) defined on the hooks (30).

17. A gas flow monitor for automatically shutting off downstream gas conduits when a defined maximum flow is exceeded, the gas flow monitor comprising:
a housing (1);
a valve seat (4) arranged within the housing;
a closing body (10) having a weight, the closing body coupled to the housing (1) and moveable relative to the housing (1) from an open position to a closed position adjacent to the valve seat (4), along a path of travel in a direction of gas flow;
a spring (12) disposed between the housing (1) and the closing body (10) for urging the closing body (10) toward the open position;
the path of travel including a transition region adjacent to the open position such that, in a horizontal installation position, a normal force perpendicular to the path of travel acts to radially displace the closing body relative to the housing, in aligning a longitudinal axis of the closing body with a longitudinal axis of the housing, such that a magnitude of the normal force approximately corresponds to a force exerted by the weight of the closing body on a pin in a vertical installation position with a gas flow directed upwards.

18. A gas flow monitor for automatically shutting off downstream gas conduits when a defined maximum flow is exceeded, the gas flow monitor comprising:
- a gas-tight housing (1) defining in a housing interior a valve seat (4) and a guide bore (8), the housing (1) having a longitudinal axis parallel to a flow direction;
- a closing body (10) supported on a pin (9) disposed through the guide bore (8), the closing body (10) axially movable from an open position spaced from the valve seat (4) to a closed position adjacent to the valve seat (4), the pin (9) having along a pin length a first region of constant diameter and a second region of varying diameter adjacent the first region, wherein in a horizontal installation position the pin (9) is arranged such that the first region of the pin (9) is disposed within the guide bore (8) when the closing body is in the open position so as to skew a longitudinal axis of the pin (9) relative to the longitudinal axis of the housing (1);
- wherein when the gas flow monitor is installed in a horizontal position, the second region of the pin (9) aligns the longitudinal axis of the pin (9) to the longitudinal axis of the housing (1) at a start of a closing movement.

19. A gas flow monitor for automatically shutting off downstream gas conduits when a defined maximum flow is exceeded, with a gas-tight housing that has in a housing interior a valve seat for an axially movable closing body that is held against a direction of flow in an open position by spring force, wherein play of the closing body relative to the housing (1) is greater in the open position and continuously narrows at the start of a closing movement; wherein the spring force restores the closing body (12) to the open position when the defined maximum is not exceeded; and wherein a bevel (16) of the constriction of the play of the valve seat relative to the housing (1) at the start of the closing movement is determined in such a manner that approximately the same force against the closing movement is required to lift the closing body (10) in aligning a longitudinal axis of the closing body with a longitudinal axis of the housing, with the gas flow monitor installed in a horizontal installation position as is required with the gas flow monitor installed in a vertical installation position and an upward flow direction.

20. The gas flow monitor according to claim 19, wherein the closing body (10) is mounted on a pin (9) permanently connected to the housing (1).

* * * * *